Sept. 14, 1937. J. M. STINCHFIELD 2,092,896
DISPLAY TYPE TUBE TESTER
Filed March 19, 1932 2 Sheets-Sheet 2

INVENTOR
J.M. STINCHFIELD
BY
ATTORNEY

Patented Sept. 14, 1937

2,092,896

UNITED STATES PATENT OFFICE 2,092,896

DISPLAY TYPE TUBE TESTER

John Maxwell Stinchfield, Rutherford, N. J., assignor to Radio Corporation of America, a corporation of Delaware Application March 19, 1932, Serial No. 599,861

13 Claims. (Cl. 250—27)

This invention relates broadly to tube testing apparatus and more particularly to a tube tester adapted to test radio tubes under conditions closely approximating actual operation thereof.

It is an object of this invention to provide a tube testing appliance which is adapted to test substantially all types of tubes now in use in the radio art.

Another object is to provide a tester which indicates directly the condition of a tube under test.

Another object of the invention is to provide a tube tester which will indicate the condition of substantially all types of radio tubes by indicating directly whether the tube should be renewed or is weak or good.

Other objects of the invention are to provide a tube tester which is simple in design, easy to operate and practically fool proof.

Figure 1:
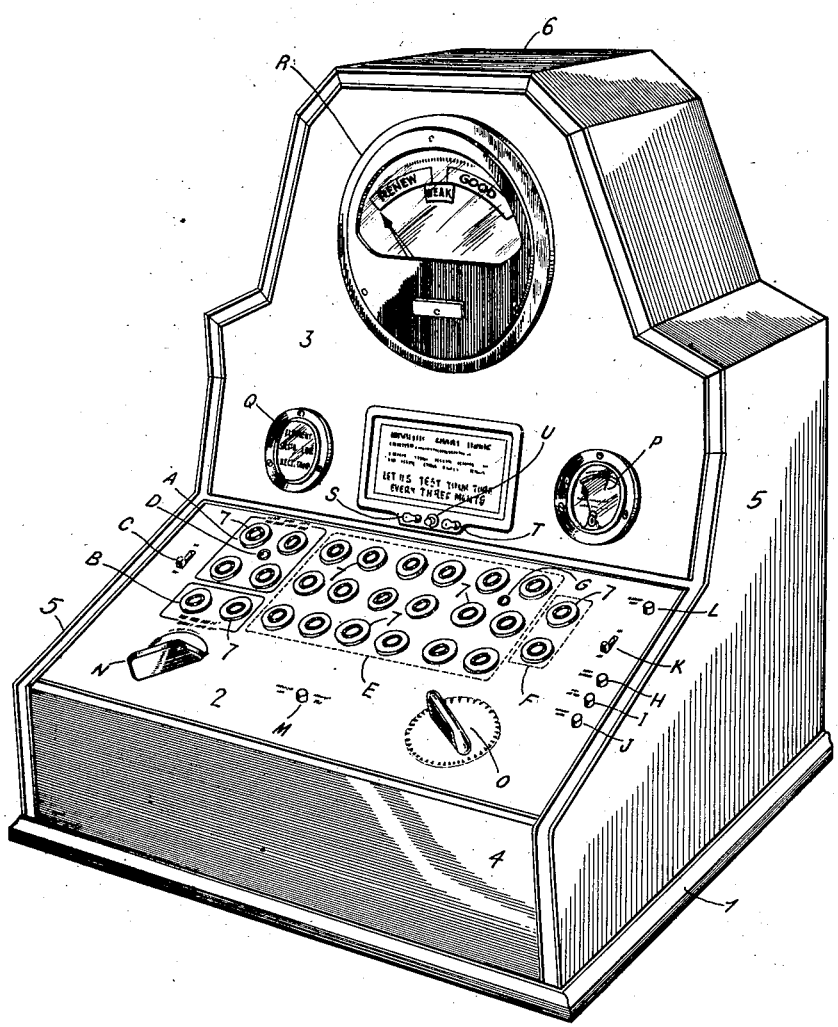
Figure 2:
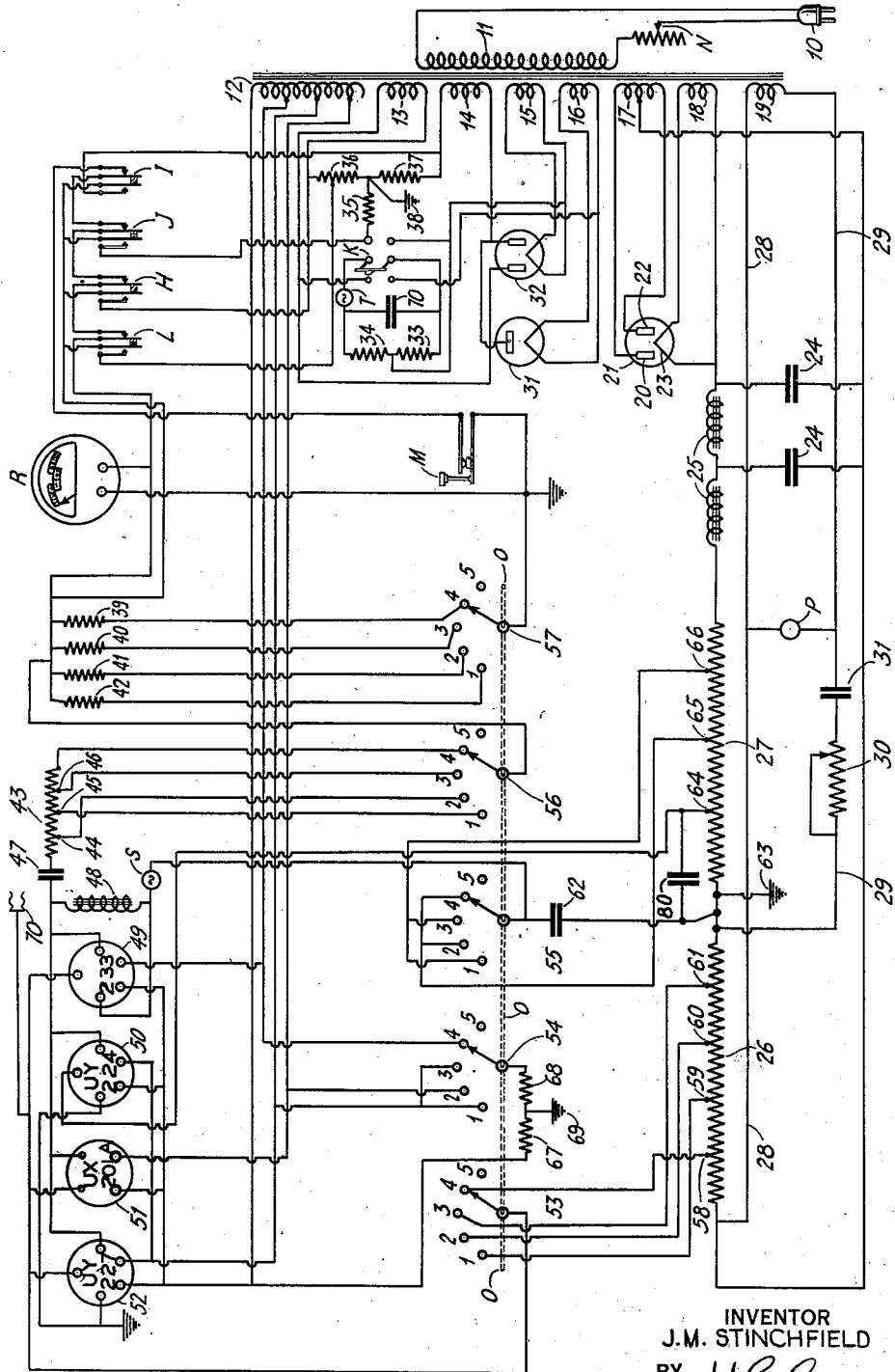

Still other objects of the invention will be apparent from a reading of the following detailed specification thereof in connection with the drawings in which, Fig. 1 is an elevation in perspective of a preferred form of the invention; and, Fig. 2 is a circuit diagram of the invention illustrating the circuits utilized for testing several types of radio tubes.

In the circuit diagram chosen for purposes of illustration of the invention, only the circuits for testing several of the known types of radio tubes are given. It is to be understood, however, that this has been done only to simplify the description of the invention and that the adding of means to test other types of tubes in view of the circuits shown by Fig. 2 is merely a matter of calculating the minimum current with proper value load resistance which a tube on the point of useful life will have as determined experimentally, and providing the necessary additional sockets, voltages and selective switching means.

Fundamentally the invention consists in providing a circuit which tests a tube with recommended voltages applied to all electrodes, impressing a 60 cycle signal voltage on the control grid of the tube under test and measuring the voltage developed across a fixed load in the plate circuit as determined from the current flowing through the load, indicated by a current meter.

In a preferred form the magnitude of the peak input signal voltage set is approximately 90% of the control grid bias. This value was selected as a compromise between 100% signal input with attendant possibilities of drawing control grid current and a value below 90% that might not swing the grid over a sufficient part of the operating characteristics. The value of the load chosen is representative of the loads under which the tube operates under actual conditions. By using a copper-oxide meter in series with the load resistance, the indication of the meter should be a direct figure of merit of the tube in actual operation.

The copper-oxide meter, which is inserted in series with the load, indirectly indicates the load voltage developed. From a knowledge of the minimum voltage that should be developed across the load for a tube at the end of its useful life, a meter shunt can be provided which will result in a tube at the end of its useful life causing the pointer on the meter to deflect to a certain calibration point on the scale. Thus any tube giving an indication above this point would be a normal tube whereas an indication below this point indicates that the tube is below normal. It is to be noted that a knowledge of the load current and load resistor gives the power output of the tube as power output is equal to $I^2R$ where I is the current in the load circuit and R is the value of the load resistor. Power output is the most important figure of merit of a power tube.

A feature of the present invention is that the meter employed in conjunction with the circuits has a meter scale comprising three arc segments which may be marked "Renew", "Weak", and "Good". The range just below the passing point mentioned above is designated "Weak" with this range overlapping the "Good" range around the passing point. The lower end of the "Weak" range is similarly overlapped by the upper end of the range marked "Renew". The three ranges "Renew", "Weak" and "Good" may be colored as desired for instance red, yellow and green respectively. It is to be understood, of course, that any other style of marking may be used although it is believed that the one indicated here is capable of being more easily understood by the layman.

Another feature of the invention is the manner in which it is put up or housed. In this respect the housing takes the form of a cabinet having a switchboard and a meter panel.

In Fig. 1 the housing for the various circuits involved comprises a base 1, a slightly inclined tube socket and switch panel 2 and a substantially vertical instrument or indicator panel 3 projecting from the rear edge of the socket and switch panel 2. The contour of the instrument panel 3 is such as to form an artistic setting for the various instruments mounted thereon. In the case shown the shape of the instrument panel takes a form similar to a mantel clock in which the face of the main meter or indicator R is placed symmetrically at the upper portion of panel 3 and the various other instruments and indicators P, Q, etc. are arranged along the lower portion. A suitable front piece 4 and suitable side pieces 5, 5 together with a back plate (not visible) and top piece 6 complete the housing.

The tube socket and switch panel 2 has mounted thereon a plurality of tube sockets for accommodating the tubes 7 as shown, a selector switch arrangement O for selecting the various circuits, a line voltage control device N, on and off line, switch C, rectifier selector switch K, meter reading push button M, half wave rectifier plate current button L, full wave plate current selector buttons H, I, total full wave plate current button J and control grid cap connections D and G for purposes to be hereinafter described in connection with the circuit diagram. The instrument panel 3 includes a tube condition meter R with markings to indicate the condition of the tube being tested, a tube short circuit indicator Q, a line voltage indicator P, a suitable receptacle for instruction cards and/or advertising matter, a protective lamp S for receiving type tubes, a protective lamp T for rectifier type tubes and a switch U for lighting up the instruction cards.

More specifically, in Fig. 1 the panel 2 includes four sets of tube sockets A, B, E and F. Set A comprises four pre-heater and short-test sockets for tubes other than rectifiers. The purpose of the four sockets is to enable an operator about to test a number of tubes to pre-heat the filaments of the tubes so as to avoid waiting the requisite time necessary to heat the filaments when the tube is about to be tested. In other words, by this arrangement a tube may be heated in preparation for testing while another one is being tested. The sockets are also connected by circuits as will hereinafter be described so as to indicate whether or not any of the elements therein are shorted in which case the indicator window will light up. Along with the four tube sockets mentioned above there is provided a control grid cap connection D which may be connected to the cap on top of so-called screen grid tubes by means of a suitable connector not shown. Set B comprises two tube sockets just below the sockets of set A above described. Set B is provided for testing 4 and 5 prong tubes other than indirectly heated cathode tubes for shorted elements. Set E comprises a plurality of tube sockets 7 for making operation tests on receiving type tubes. Each of the sockets has suitable indications to designate the type of tube which is to be inserted.

A control grid clip connection G is provided for testing tubes which have the control grid caps. Set F comprising the two sockets at the right of the panel is provided for testing full wave and half wave rectifier tubes.

The line voltage adjusting device N is adapted to act in conjunction with the meter P.

Having described the general assembly of the tester attention is now directed to Fig. 2 which illustrates a wiring diagram of a simplified tester incorporating various features of the invention.

The simplified tester is provided with six tube testing sockets. Specifically these sockets are for testing 227, 201A, 224, 233, 280 and 281 type tubes.

In Fig. 2, a transformer is provided having a primary winding 11 and a plurality of secondary windings 12–19 inclusive. Primary winding 11 is adapted to be connected to suitable alternating current commercial power mains through rheostat N by means of plug 10. A full wave rectifier 20 having two anodes 21 and 22 and a cathode 23 is utilized for the purpose of rectifying the alternating current. Rectifier 20 is connected to the source through anode circuit secondary winding 17 and cathode secondary winding 18. The output of the rectifier is filtered by the usual filter circuit comprising a pair of condensers 24 and a pair of choke coils 25. The output circuit of rectifier 20 includes a pair of tapped resistances 26 and 27 for a purpose to be hereinafter described. A circuit is shunted across resistance 26 comprising a conductor 28, secondary winding 19, conductor 29, condenser 31 and variable resistance path 30. A voltmeter P is connected across conductors 28 and 29 for checking the primary voltage of 11.

A plurality of selector switches 53—57 are provided. All these switches are on the same shaft O thereby providing a uni-control selector system. Selector switch 53 is adapted to select the proper control grid potential for each of the tubes, and is provided with four selector points one for each of the grid connections in tube sockets 49–52 inclusive. Each selector point is connected to a point on resistance 26 which gives the required potential for the particular tube.

The filaments or heater terminals of the four tube sockets 49–52 are provided with the necessary potential by means of secondary winding 12. It should be noted that winding 12 has a plurality of taps so that the proper filament or heater element voltage for each particular tube socket is maintained at all times without need for a selector switch. However, since all the filaments and heater elements are energized by means of alternating current it is desirable that grid and anode returns be made with respect to midpoint of the filament. For this purpose there is provided a selector switch 54 and electrical center balance circuit comprising two resistances 67 and 68 having their common point grounded at 69. The electrical center balance circuit through the medium of selector switch 54 is shunted across that particular portion of secondary 12 being utilized for energizing the filament or heater element as the case may be of the tube being tested.

Selector switch 55 is for the purpose of supplying the various anode leads of the various tubes to be tested with the proper potential. The plate leads of the four tube sockets are connected in common through choke coil 48 to the movable arm of selector switch 55. The various taps of switch 55 are connected to desired points on the voltage divider 27.

The invention provides that each tube shall be tested at the proper load. For applying this proper load a resistance load is utilized the value of which is chosen by means of selector switch 56 whose taps connect to various points on resistance strip 43. Meter R previously described in connection with Fig. 1 has shunted across it a plurality of resistances 39–42 inclusive in connection with selector switch 57 to the various taps of which the various shunt resistances are connected. The load placed on any particular tube being tested is made up of the choke coil 48 connected back to the cathode through the parallel combination of the plate supply by-pass condenser 62, that portion of the resistance of voltage divider 27 across which it is connected by selector switch 55, the blocking condenser 47 in series with the load resistor 43, the parallel resistance of the meter and the shunt resistance. To simplify the circuits it is advisable to cover all tube types to be tested by four general load values, namely, 2000 ohms for three element power tubes, 5500 ohms for general purpose amplifier tubes and types 247 and 233 pentodes, 12,500 ohms for type 238 pentodes, and 20,000 ohms for screen grid type tubes. Although the plate loads for screen grid tubes average on the order of 100,000 ohms in commercial receivers the value of 20,000 ohms herein used provides a satisfactory test.

The values of the meter shunt resistances 39–42 inclusive are calculated by determining the value of the alternating plate current that will flow through the load for a tube on the end point. Once this is determined, the value of the meter shunt resistance is readily calibrated for a given meter deflection. The value of meter shunt resistance for each particular type tube is chosen so that the reading of meter R is the same for all tubes tested falling within the three classes mentioned, namely, "Renew", "Weak" and "Good". It should be noted that the meter R is normally shorted by the circuit including key M and keys L, H, J, I, therefore, in order to read the meter this short must be removed by pressing key M.

In testing 224 type tubes it is necessary to apply a screen grid voltage. This is obtained by connecting the screen grid terminal of the 224 socket, which in Fig. 2 is socket 50, directly to the proper voltage tap 64 on the voltage divider 27. The screen grid lead is by-passed by condenser 80 to the negative return lead. The purpose of the condenser is to reduce the screen grid impedance introduced by the divider system to an inappreciable value. In the case of 233 type tubes the screen grid voltage is obtained by connecting the screen grid terminal of the 233 socket 49 to movable arm of selector switch 55. This insures that the screen grid terminal receives the same voltage as the anode except for the slight drop across choke coil 48.

As previously discussed, the testing apparatus includes means for testing rectifier tubes of the 280 and 281 types under conditions ordinarily encountered in rectifier circuits. For this purpose, a switch K is provided which when thrown to the right is adapted to make connections for the 280 type tubes and when thrown to the left it is adapted to make connections for the 281 type rectifier tubes. In the case of the 280 type tube the switch K being thrown to the proper position results in shorting a filter resistance 33 leaving resistance 34 with condenser 70 of the filter circuit. The circuit is adapted to supply the proper voltage to each plate of the full wave rectifier 32. Meter shunt resistors 36 and 37 are connected in series with the low potential side of the high voltage windings. From the center tap of these resistors a resistor 35 is connected to one side of the filter load. The other side of the load connects back to one side of the filament of tube 32 when the switch K is in the proper position. Filament voltage for tube 32 is supplied directly from winding 15. To obtain a reading on the tube condition meter R for rectifier tube 32 the selector switches are all moved by the single control to position No. 5.

It is, of course, desirable to test both plate circuits of a full wave rectifier. For this purpose a key switch H is depressed or, looking at Fig. 2, thrown to the left which results in connecting the ungrounded side of meter shunt resistance 36 to the ungrounded side of the tube condition meter. The other side of resistance 36 is permanently grounded and as one side of the meter is grounded the connection is complete for reading the rectified current flowing through the resistance 36. When switch H is depressed the right hand contacts are opened which in turn open the short circuit on the meter. The second plate of the tube 32 is read by depressing key I which connects the meter across resistance 37. In order to test the total plate current key J is depressed which, as shown by the diagram, connects the meter across resistance 35 which is equal to one half the value of either resistance 36 or resistance 37.

Half wave rectifier tubes, such as shown at 31, are tested by throwing the switch K to the 281 type tube position which results in a proper value filter load parallel with the condenser 70. The proper filament voltage for tube 31 is supplied directly from the secondary winding 16. The plate current of the tube is measured by depressing a key L which connects the ungrounded side of the meter to the ungrounded side of the resistor to a portion of resistance 36 as shown. The grounded side of the meter connects back to the grounded side of resistance 36.

As previously discussed, the circuit includes a pair of protective lamps S, T which protect the circuits from excess currents and voltages should any high voltage shorts on receiving or rectifier tube types result.

In order to understand the invention more clearly, the procedure of testing one of the tubes will be followed through. For this purpose, testing a 227 tube in socket 52 will be described. The proper filament voltage is maintained at all times with each particular socket without need of a selector switch by means of the secondary winding 12. For obtaining the correct control grid voltage the switch 53 is rotated until the movable arm comes in contact with the terminal 1. As is evident from the drawings this gives the proper voltage to the control grid of the 227 type tube. To obtain the proper plate voltage for this tube the selector switch 55 is rotated to the number 1 position which connects the plate terminal of the tube inserted in socket 52 to a point on the resistance 27 which will be at a difference of potential of 180 volts with respect to the cathode of the tube. The control grid bias placed on the tube is, in the instance taken, 13½ volts. Since, as previously described, all the filaments are energized with alternating current, it is desired that the grid and plate returns be made with respect to the center tap of filament, for this purpose, the selector switch 54 is provided. The common side of the filament transformer is connected through a 15 ohm resistance to ground. The other side of the filament is connected through a second 15 ohm resistance to ground by means of the selector switch 54 which selects the proper filament tap. For the 227 tube the proper position would be the No. 1 position. The signal input is impressed through the blocking condenser 31 across the direct current grid bias divider. The value of the signal input for any particular tube is determined by the position of the grid bias tap of the selector switch 53 and is numerically equal to the product of the total signal input (31.8 volts R. M. S.) and the ratio of the desired direct current grid bias to the total grid bias which may be taken as 50 volts. For the 227 type tube the signal input would be obtained as follows:

$$\frac{13.5}{50} \times 31.8 = 8.6$$

which gives the signal input voltage R. M. S. In the case of a 201A tube which employs 11½ volts bias the signal input is equal to $$31.8 \times \frac{11.5}{50} = 7.3 \text{ volts R. M. S.}$$

The voltmeter P measures the secondary voltage of the transformer that supplied the signal input. It should be stated here that for tubes which draw large values of plate current such as 245 and 247 type power tubes the effect of the large plate current is to increase the direct current grid bias above the value calculated. To compensate for the effect of the plate current an average tube is inserted for the particular type being tested and the grid bias tap is adjusted until the correct grid bias is obtained. This, of course, would be done at the factory once and for all. It is seen, therefore, that the value of the alternating current input will have to be recalculated on the bias of final position of the grid bias tap. Continuing with the test of the 227 tube the proper value of the load resistance is chosen by means of selector switch 56 whose taps connect to resistance strip 43, as previously described. In the case of a 227 type tube it has been found that a resistance of 5414 ohms placed in series with the meter and the meter shunt resistor obtained through the switch 57 of 186 ohms is proper. Key M is then pressed removing the short across the meter with a result that the meter is deflected to indicate directly the condition of the tube.

In order that good tubes result in a reasonably large deflection on the meter and also that especially good tubes do not cause the pointer going off the scale it is advisable that the meter used be designed by having the moving coil thereof moved in a uniform magnetic field from zero deflection to about 85% of the full scale arc length. The pole pieces beyond this point should be designed so that a much greater coil current will be required to result in 100% of full scale deflection.

It is to be understood that the numerical values given in the specification are values found to be satisfactory in actual circuits, however, many other suitable values for the resistance and voltages employed may be found and, therefore, the values given are not to be construed as limiting the disclosure in any particular.

I claim:

1. In a tube testing device, a plurality of tube sockets adapted to receive vacuum tubes having different characteristics, a source of electrical energy adapted to furnish the various terminals of said sockets with the proper voltages for testing said tubes, a selector switch for selectively energizing any one of said sockets, a tube condition indicating meter for indicating directly the condition of any tube under test, a plurality of shunts for said indicating meter, and means controlled by said selector switch for selecting such a value of shunt for the meter for each type of tube under test that the reading of the meter is the same for similar conditions of the different type tubes adapted to be tested in the testing device.

2. A tube testing device comprising a transformer having a primary winding connected across an alternating current source and a tapped secondary winding for supplying different voltages, a plurality of tube sockets adapted to receive vacuum tubes having different characteristics, the several sockets having their filament terminals connected through said taps across portions of said secondary, an electrical center balance circuit for said secondary and a selector switch adapted to shunt said center balance circuit across any portion of the secondary.

3. In a tube testing device, a transformer having a primary winding connected across a source of current and a tapped secondary winding, a plurality of tube sockets adapted to receive vacuum tubes having different characteristics, the several sockets having their cathode heating terminals connected through said taps across various predetermined portions of said secondary winding, an electrical center-balance circuit for determining the electrical center of any one of said cathode heating circuits, and a selector switch adapted to connect said center-balance circuit to any one of said heating circuits.

4. The method of testing tubes which comprises supplying the various elements of the tube to be tested with their respective normal recommended voltages, impressing upon the input terminals of the tube an alternating current signal bearing a predetermined ratio to the impressed grid biasing potential and measuring the voltage developed across a load placed across the output terminals of the tube caused by the impressed signal, the magnitude of the load for each tube being such that the voltage developed across the load is substantially the same for different type tubes in a similar condition is the same.

5. In a tube tester adapted to test various tube types, a plurality of tube sockets adapted to receive the tubes to be tested, each socket being adapted to hold a different type tube, a source of filament current for all of said tubes said source being adapted to supply each filament terminal with the proper voltage, and means for grounding the midpoint of any one of the filaments comprising a selector switch adapted to shunt a resistance grounded at its midpoint across any one of the filaments.

6. In a tube testing device, a plurality of tube sockets for receiving different types of vacuum tubes to be tested, an alternating current supply and connections thereto from the tube cathode heating terminals for applying different voltages to heat said cathodes, and means for selectively connecting a center tapped connection across any of said cathode heating terminals.

7. In a tube testing device, a plurality of tube sockets adapted to receive vacuum tubes having different characteristics, a source of direct current, a voltage divider connected across said source comprising a plurality of resistance elements, one of said resistances being tapped at various points thereof said taps being adapted to be connected to the various anode terminals of said sockets through a selector switch, the other of said resistance elements having a plurality of taps adapted to be connected to the various grid electrode terminals of said sockets through a selector switch, a source of alternating current shunted across said last named resistance element for impressing a signal upon the input terminals of the sockets, and means controlled by said second named selector switch for determining the voltage of said signal.

8. In a vacuum tube tester in combination, a transformer having windings for filament lighting, plate excitation, and grid biasing, a tube socket, circuits associating said windings and socket, a milliammeter in the plate circuit, a plurality of shunts for said meter and means to select such a capacity shunt with the meter for each type of tube that the meter reads the same for similar conditions of different type tubes.

9. In a testing device for vacuum tubes, the combination of means for energizing a tube, means for measuring an operating characteristic of the tube, means for indicating the classification of said tube in one of a plurality of predetermined classes, and selective means for changing the energization of tubes to produce equivalent indications for tubes of different type having the same worth.

10. In a testing device for vacuum tubes, the combination of means for energizing a tube, means for measuring an operating characteristic of the tube, means for indicating the classification of said tube in one of a plurality of predetermined classes, and selective means for changing the characteristics of the indicating means to effect a similar classification of tubes of a different type.

11. In a testing device for vacuum tubes, the combination of means for energizing a tube, with meter means for measuring an operating characteristic of the tube, a plurality of shunts for said meter and a shunt selector switch having indicia for different tubes, for connecting any of a plurality of predetermined shunts in circuit with said meter to effect classification of different types of tubes according to a single standard of classification with the same meter.

12. In an audion tube tester, the combination with a normally deenergized transformer having its primary and secondary windings arranged to supply a plurality of voltages, and an electrical network comprising a plurality of circuits connected to the transformer and to the tube elements, of an electrical measuring means connected in said network, a plurality of selector switches connected in the electrical network intermediate the transformer and the tube elements, and a single means synchronously to operate all of the selector switches to select the proper circuits and to apply the proper voltages to the tube elements to test the electrical condition of said element.

13. In a testing device for electronic tubes, the combination of means for energizing a tube with meter means for measuring an operating characteristic of the tube, means for impressing an alternating current voltage across the input of a tube to be tested which voltage is representative of signal energy, a plurality of shunts for said meter and a selector switch for connecting any one of the said plurality of predetermined shunts in circuit with the meter to effect classification of different types of tubes according to a single standard of classification with the same meter.

JOHN MAXWELL STINCHFIELD.